United States Patent
Glikin et al.

(10) Patent No.: US 9,816,592 B1
(45) Date of Patent: Nov. 14, 2017

(54) ACTUATOR FOR CHOKE VALVE

(71) Applicant: Tol-O-Matic, Inc., Hamel, MN (US)

(72) Inventors: Igor Glikin, Plymouth, MN (US); Ryan T. Klemetson, Buffalo, NY (US); Gary W. Rosengren, Brooklyn Park, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 0 days.

(21) Appl. No.: 14/874,687

(22) Filed: Oct. 5, 2015

Related U.S. Application Data

(60) Provisional application No. 62/059,566, filed on Oct. 3, 2014.

(51) Int. Cl.
| | |
|---|---|
| F16H 25/20 | (2006.01) |
| F16K 31/06 | (2006.01) |
| F16K 31/04 | (2006.01) |
| E21B 21/10 | (2006.01) |

(52) U.S. Cl.
CPC ....... *F16H 25/2021* (2013.01); *E21B 21/106* (2013.01); *F16K 31/04* (2013.01); *F16H 2025/2081* (2013.01)

(58) Field of Classification Search
CPC ..... F16D 2023/0687; F16D 2023/0693; F16D 2125/40; F16H 25/20; E21B 21/106; E21B 21/08; E21B 34/08; E21B 34/066; E21B 34/063
See application file for complete search history.

(56) References Cited

U.S. PATENT DOCUMENTS

| | | | |
|---|---|---|---|
| 4,920,811 A * | 5/1990 | Hopper | E21B 33/0355 251/129.11 |
| 5,009,554 A | 4/1991 | Kameyama et al. | |
| 6,691,587 B1 * | 2/2004 | King | E21B 34/06 251/59 |
| 8,851,451 B2 | 10/2014 | Orino et al. | |
| 2006/0081398 A1* | 4/2006 | Arian | E21B 49/06 175/58 |
| 2009/0227415 A1* | 9/2009 | Buelna | B64C 29/0033 475/346 |
| 2013/0248203 A1 | 9/2013 | Scott et al. | |
| 2014/0034303 A1 | 2/2014 | Joseph et al. | |

FOREIGN PATENT DOCUMENTS

JP   2006214560 A   8/2006

OTHER PUBLICATIONS

Search Report and Written Opinion dated Oct. 6, 2016 for PCT Application No. PCT/US2016/037759, 15 pages.

\* cited by examiner

*Primary Examiner* — Ramya Burgess
*Assistant Examiner* — Lillian Nguyen
(74) *Attorney, Agent, or Firm* — Patterson Thuente Pedersen, P.A.

(57) ABSTRACT

Devices and methods for operating a linear actuator, optionally for use in controlling a choke valve as part of a managed pressure drilling operation. Such a device may include a motor, a transmission, a linear actuator and an override mechanism selectively engageable with the transmission to enable operation of the linear actuator independently of the motor.

5 Claims, 15 Drawing Sheets

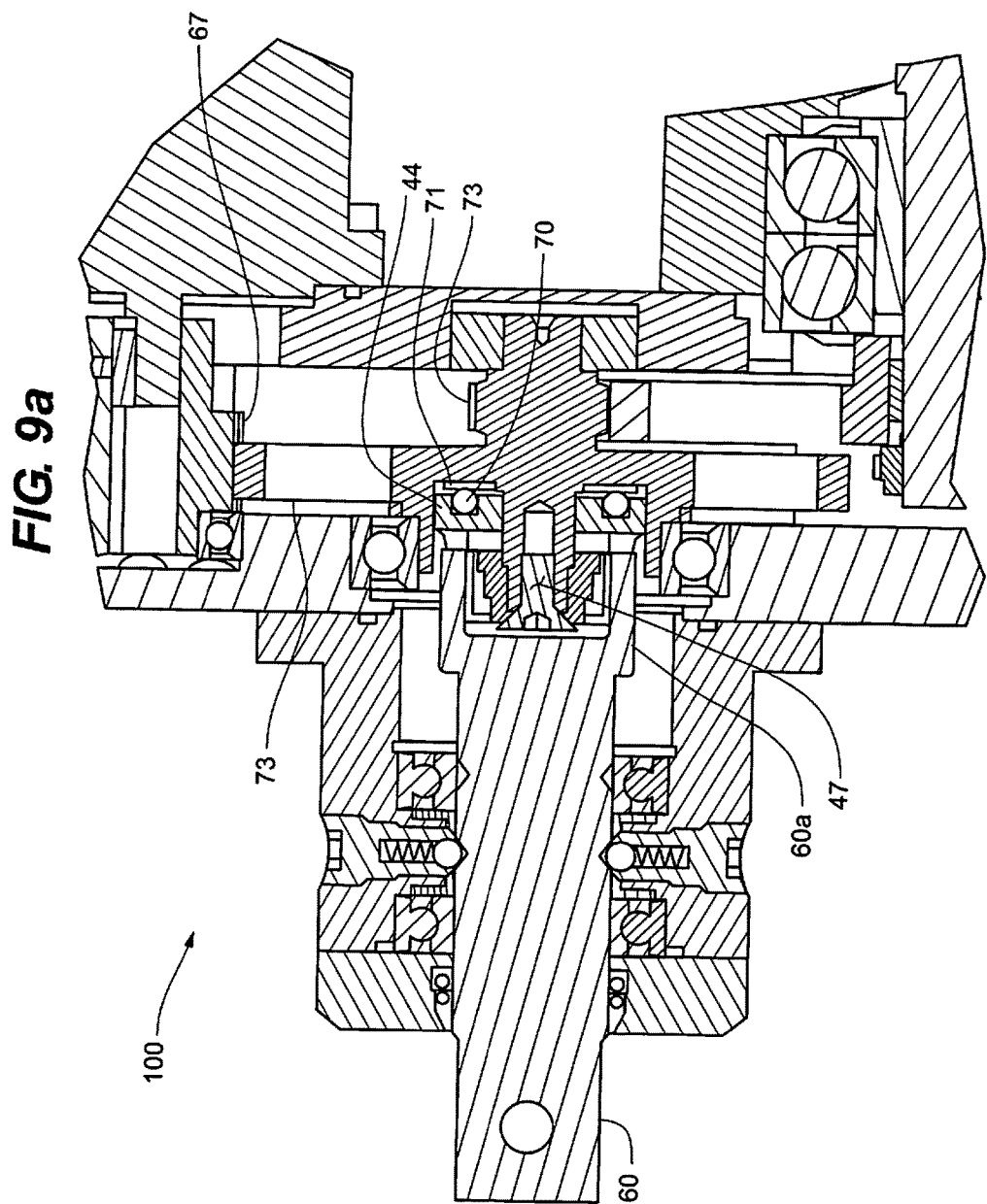

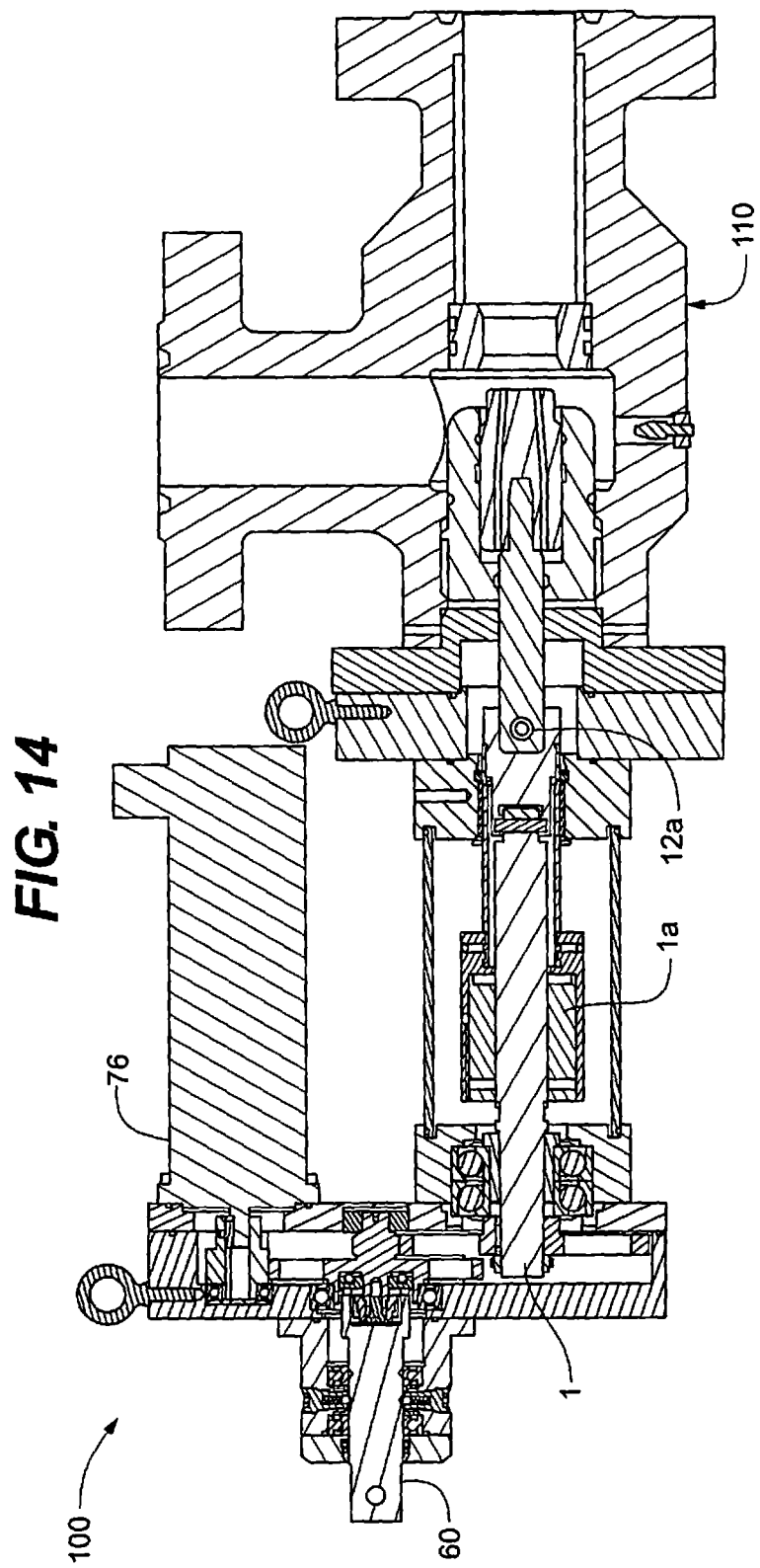

ACTUATOR FOR CHOKE VALVE

RELATED APPLICATION

The present application claims the benefit of U.S. Provisional Application No. 62/059,566 filed Oct. 3, 2014, the disclosure of which is hereby incorporated by reference in its entirety.

FIELD OF THE INVENTION

The present invention relates generally to subterranean boreholes, and in particular to systems for controlling the operating pressures within subterranean boreholes.

BACKGROUND OF THE INVENTION

During the drilling of exploratory wells and the drilling and completing of oil and gas wells, drilling fluid, also called drilling mud, is pumped into the well to maintain a desired pressure within the borehole. Managing the pressure in the well is necessary to inhibit or reduce the influx of formation fluids into the wellbore, while ensuring excessive wellbore pressure does not fracture the formation and lead to significant drilling fluid loss into the formation. Managed Pressure Drilling (MPD) is a drilling process in which the annular pressure profile in the borehole is controlled. MPD helps manage and mitigate potential problems associated with drilling of fractured or karstic carbonate reservoirs, well bore instability, differentially stuck pipe, and drilling formations with a tight margin between formation fracturing pressure and pore pressure.

Choke valves are utilized during managed pressure drilling to control the pressure of drilling mud coming out of the hole, and are a critical part of the drilling process as these control potentially dangerous pressure surges referred to as "kicks." Failure to adequately control these kicks may lead to a blowout of the well. Choke valves are typically controlled with some form of actuator which may be operated by pneumatic, hydraulic or electric means.

Pneumatic actuated systems have been a primary technology for valve operation for many years. They are simple, low-cost and easy to maintain. By design, pneumatic operation does not create a spark and is often specified for hazardous applications. Compressed air is also readily available in many manufacturing and process control environments.

Pneumatic actuated systems, however, have some limitations. Generally, a valve requires more shift force in a static state than when it is in motion. This trait is commonly referred to as "stick slip." To overcome stick slip, pneumatic actuated systems build up excess pressure, which can create a rapid movement once the valve is in motion. The resulting overshoot can delay settling on the specified set point or make it difficult to achieve set point at all.

In addition to stick slip, other common problems that can negatively affect pneumatic actuated systems include system demand, air quality, and ambient air temperature. These conditions, in conjunction with operating in an outdoor environment, can further impact system performance due to extreme cold temperatures. Additionally, pneumatic actuated systems typically offer low operating efficiencies on the order of 10 to 30 percent, increasing operating cost.

Hydraulic actuated systems are also expensive to operate due to the continuous power required to maintain operating pressure. However, hydraulic actuated systems continue to be deployed for valve automation processes for a number of reasons: they can be designed as self-contained systems, allowing them to be deployed in remote locations; cost of acquisition can be low to moderate, depending on the size and sophistication of the system; as with pneumatic actuated systems, hydraulic actuated systems do not require significant technical ability to install, configure and deploy; hydraulic cylinders have a very high power density; and the oil used in these systems is nearly incompressible so overall stiffness, positional repeatability and accuracy are improved over pneumatic actuated systems.

At the same time, environmental and system contamination can still negatively affect overall performance in many of the same ways a pneumatic actuated system would be affected. Oil leaking from a system will also diminish performance over time. If the level gets low enough, a leak can create a risk of component damage. Substantial leaks can be considered an environmental hazard. As with pneumatic actuated systems, hydraulic actuated systems also require a high degree of maintenance to ensure proper performance, and performance in extreme ambient air temperatures is reduced.

Electric actuators improve upon many of the shortcomings of pneumatic and hydraulic actuators. However, electric actuators rely on electricity to operate and a loss of electricity to the actuator can create a dangerous situation if the choke valve cannot be manually operated. What is still needed, therefore, is a choke valve actuator which improves upon the shortcomings of prior pneumatic and hydraulic actuators and adequately meets the needs of the industry.

SUMMARY OF THE INVENTION

In one embodiment, the present invention comprises a system including a brushless servo motor, a linear actuator including a rotatable screw and a nut coupled to the screw, a transmission coupled between the brushless servo motor and the screw, the screw configured to be retained in place and rotatable so as to cause a linear translation of the nut with respect to the screw in response to an input from the transmission, and an override mechanism selectively engageable with the transmission to enable operation of the linear actuator independently of the brushless servo motor.

In one embodiment, the present invention comprises a method for controlling a choke valve as part of a managed pressure drilling operation. The method includes operating a brushless servo motor to provide an input to a transmission, wherein the output of the transmission is coupled to a screw of a linear actuator. The linear actuator includes the screw and a nut, with the screw being rotatable by the transmission so as to cause a linear translation of the nut with respect to the screw. The nut of the linear actuator is operably coupled to the choke valve to control the opening of the valve and thereby control pressure within a wellbore.

In one embodiment, the present invention comprises a method for manually controlling a choke valve as part of a managed pressure drilling operation. An actuator assembly is provided including a transmission coupled to a screw of a linear actuator. The linear actuator includes the screw and a nut, with the screw being rotatable by the transmission so as to cause a linear translation of the nut with respect to the screw. The nut of the linear actuator is operably coupled to the choke valve. The actuator assembly also includes an override mechanism selectively engageable with the transmission, the method further comprising manually engaging the override mechanism with the transmission and rotating the override mechanism so as to manually control the opening of the valve and thereby control pressure within a wellbore.

BRIEF DESCRIPTION OF THE DRAWINGS

The invention may be more completely understood in consideration of the following detailed description of various embodiments of the invention in connection with the accompanying drawings, in which:

FIG. 9a is a close-up detail view of a portion of FIG. 9.

FIG. 14 is a cross-sectional view of the actuator assembly of FIG. 12.

Figure 1:
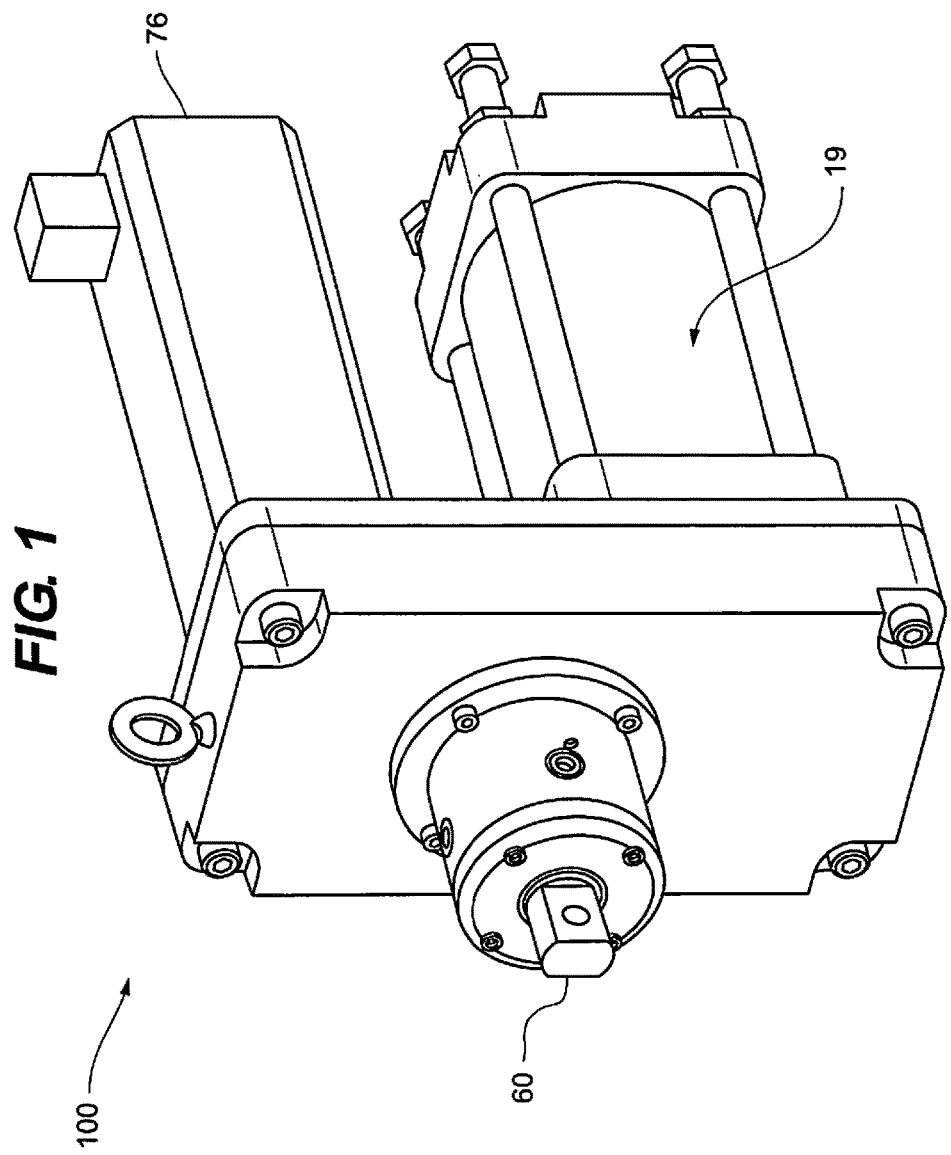
FIG. 1 is a perspective view of an actuator assembly according to an embodiment of the present invention.
Figure 2:
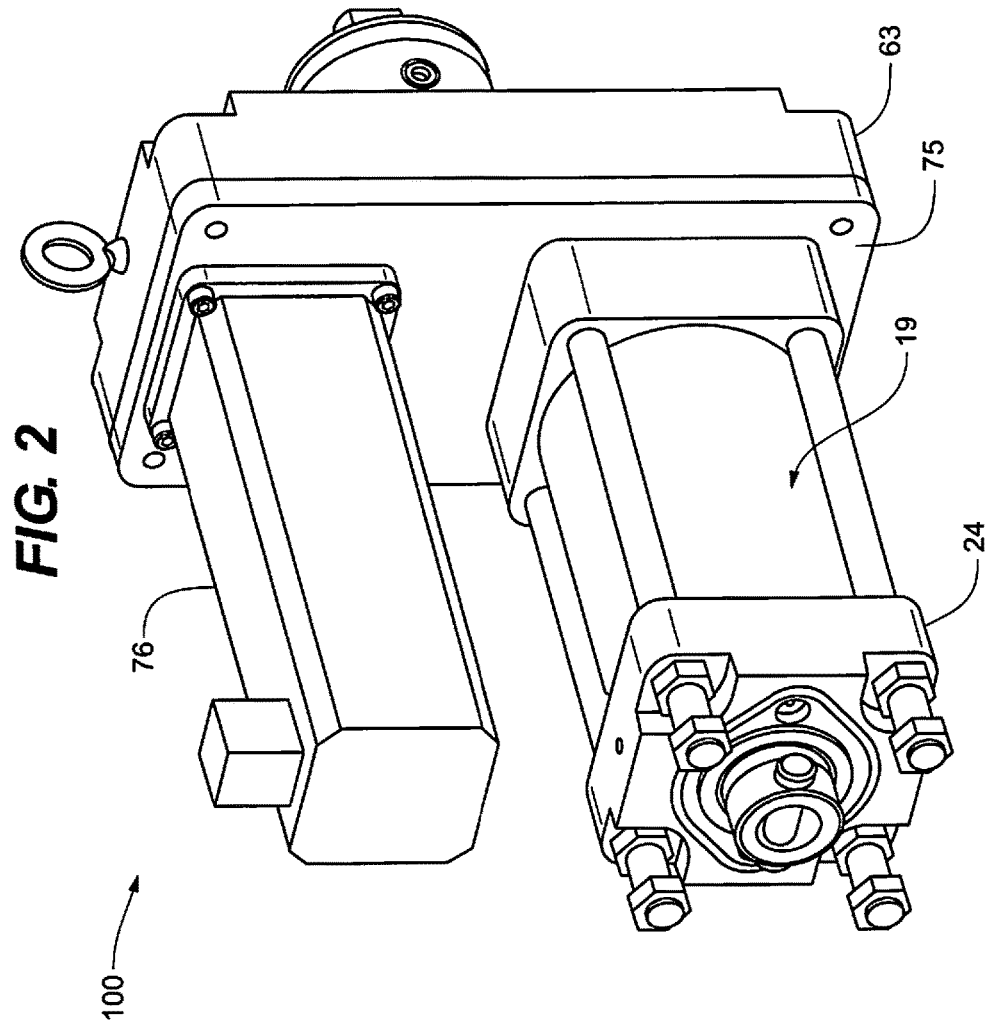
FIG. 2 is another perspective view of the actuator assembly of FIG. 1.
Figure 3:
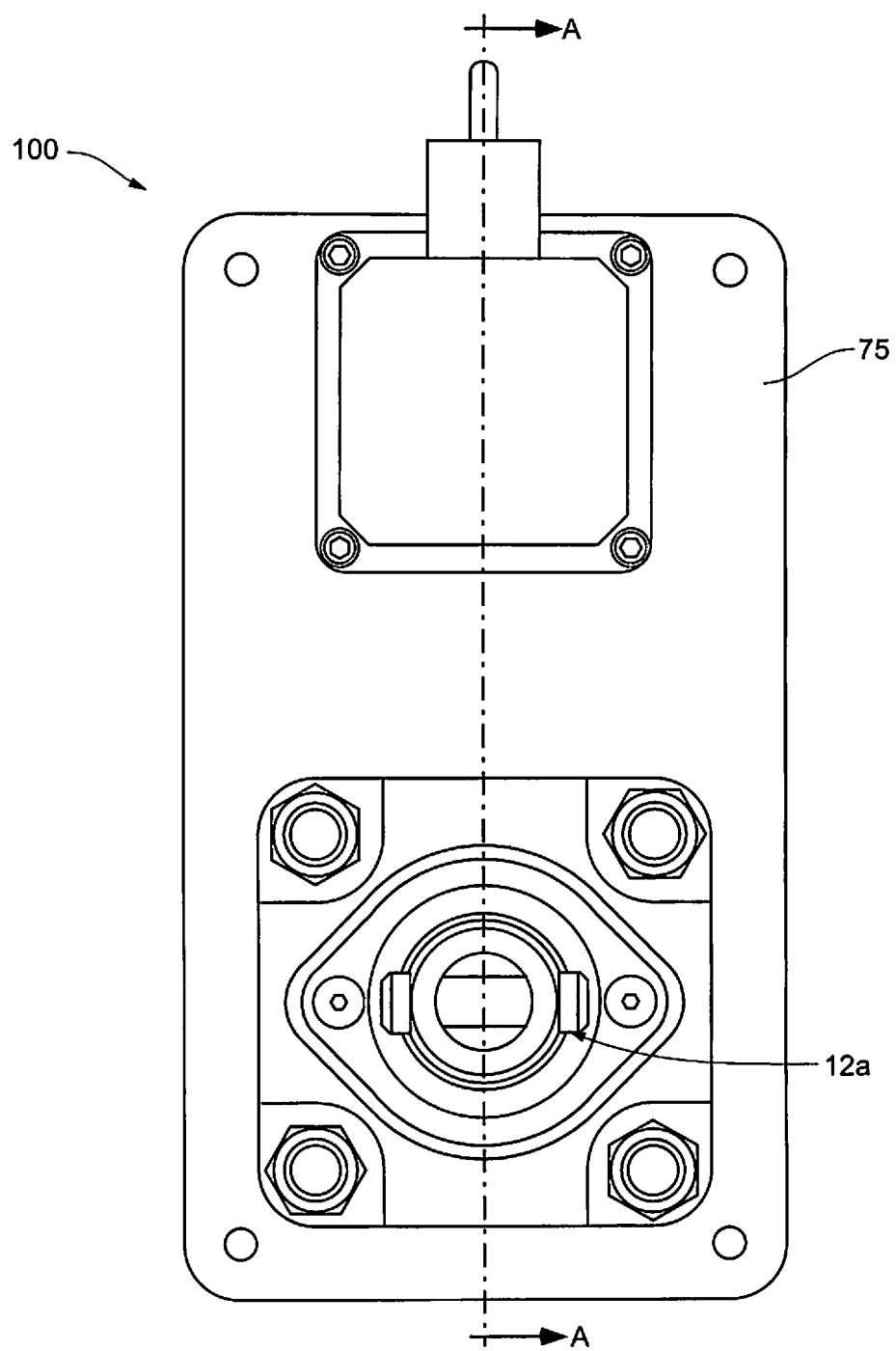
FIG. 3 is an end view of the actuator assembly of FIG. 1.
Figure 4:
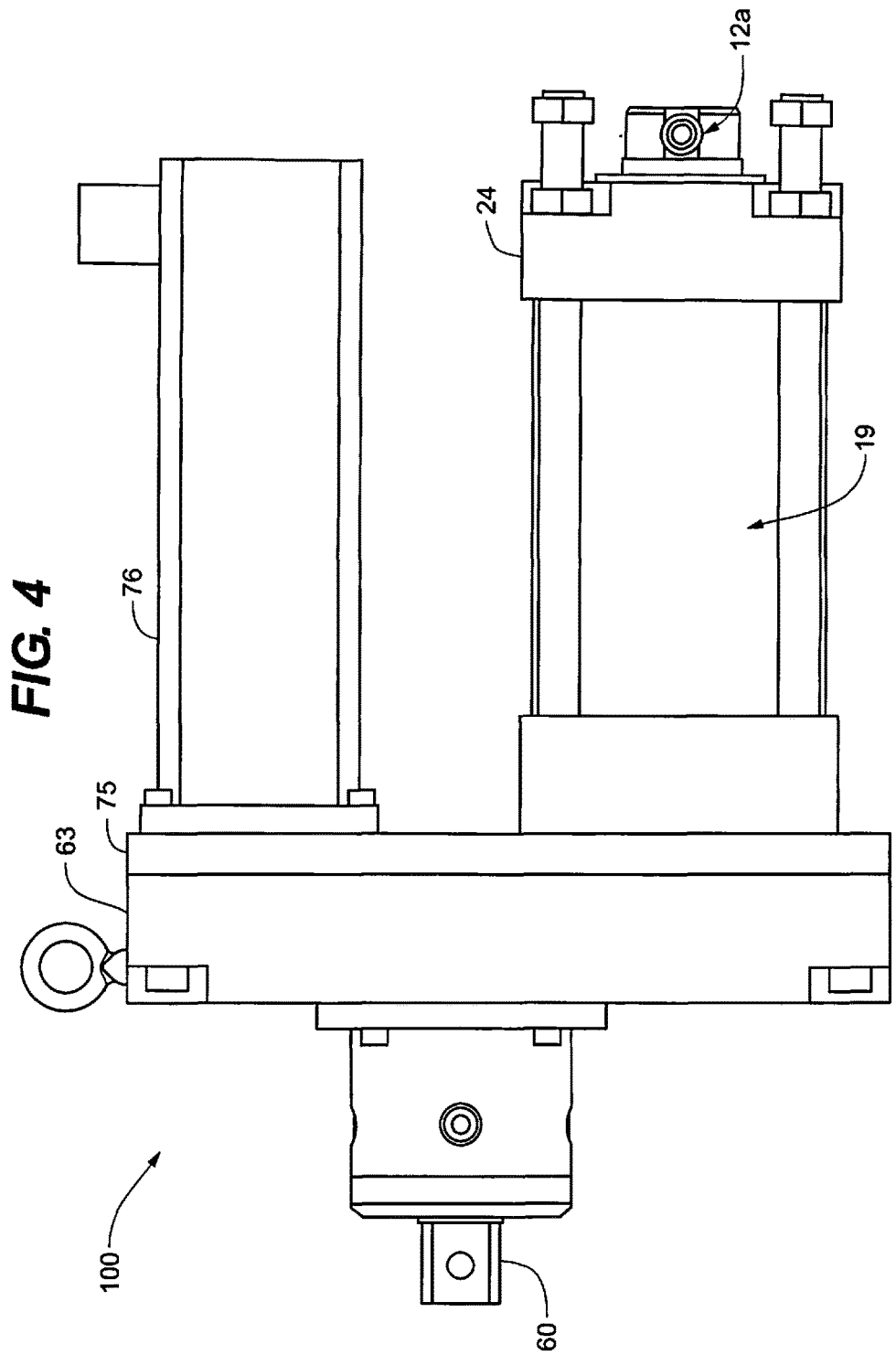
FIG. 4 is a side elevation view of the actuator assembly of FIG. 1.

While the invention is amendable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE DRAWINGS

The following detailed description should be read with reference to the drawings, which are not necessarily to scale, and depict illustrative embodiments and are not intended to limit the scope of the invention.

Referring now to FIGS. 1-6, an actuator assembly 100 is depicted, comprising an electric motor 76, a transmission unit 102, an override mechanism 104 and an actuator 106. Electric motor 76 may comprise a brushless servo motor, which offers many advantages and improvements over pneumatic and hydraulic systems known in the prior art. Motor 76 includes a permanent magnetic rotor and a wound stator, and a means for continuous position feedback from the rotor to maintain proper phasing and function, in the form of an integrated feedback device such as a digital incremental encoder, multi-turn absolute encoder, or resolver. The means for position feedback allows position, speed and torque of motor 76 to be precisely controlled and continuously monitored. These abilities allow brushless servo motors to automatically compensate for varying conditions exerted upon the mechanical end-effector attached to the stem. Using a rotary servo to create this linear movement with mechanical components such as a rack-and-pinion, planetary gear sets or more complex assemblies like a linear ball or roller screw driven actuator provides motion system efficiencies of approximately 75 to 80 percent—much higher than pneumatic-actuated or hydraulic-actuated systems.

Brushless servo motor 76 can operate more smoothly and at higher speeds than other motor types used on valve actuators. Monitoring speed and torque through the means for position feedback allows motor 76 to compensate for increased force requirements (stick slip, pressure surge, contamination or blockage in a valve) and complete a move without sacrificing speed. This capability allows motor 76 to execute push-to-force moves (full seat), or maintain a position within a dynamic circuit (burps or pressure spikes). In one embodiment, motor 76 may comprise an EB-206 model manufactured by Kollmorgen, having between 1 and 5 hp in various configurations, peak operating torque of approximately 20 Nm, and operating speeds up to 7000 rpm.

Transmission unit 102 generally comprises a plurality of gears 41, 67 and 73 coupled between electric motor 76 and actuator 106. Gears 41, 67 and 73 are sized and selected to provide a desired gear reduction. Suitable gear ratios for the present invention may be within the range of 10:1 to 40:1. In one embodiment, the gear ratio is approximately 20:1. A large gear reduction between motor 76 and actuator 106 prevents backdriving of motor 76 due to high pressures experienced during drilling within a choke valve to which actuator 106 is coupled. Transmission unit 102 is retained within a housing defined by cover 63 and plate 75. The housing also provides a means for coupling of motor 76, override mechanism 104 and actuator 106 thereto, as generally depicted in FIGS. 1-14. Although depicted as having three gears, transmission unit 102 may include any number or combination of gears as desired.

Override mechanism 104 comprises a clutch mechanism including a first clutch fork 44, one or more spring washers 45, a nut 46, a lock screw 47, a slip ring 71, and a plurality of balls 70 disposed between first clutch fork 44 and slip ring 71, as best depicted in FIG. 9A. Override mechanism 104 further comprises a selectively engageable clutch shaft 60. The inboard end of clutch shaft 60 includes a second clutch fork 60a which is selectively engageable with first clutch fork 44 by translating clutch shaft 60 into, or out of, cover 63. The outboard end of clutch shaft 60 is configured to receive a large handwheel (not pictured) or other suitable means for operating override mechanism 104.

Figure 5:
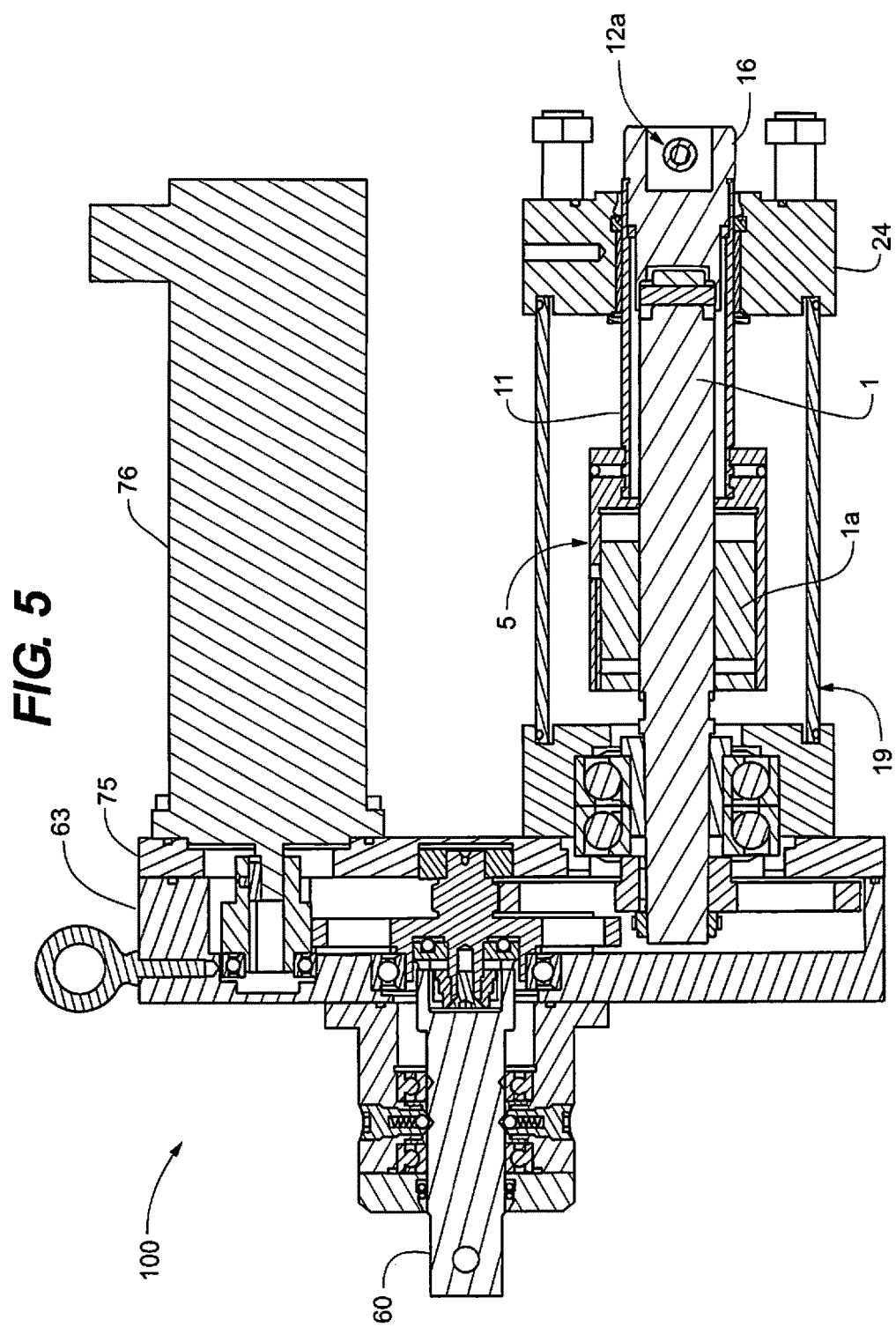
FIG. 5 is a cross-sectional view taken along the line A-A in FIG. 3.
Figure 6:
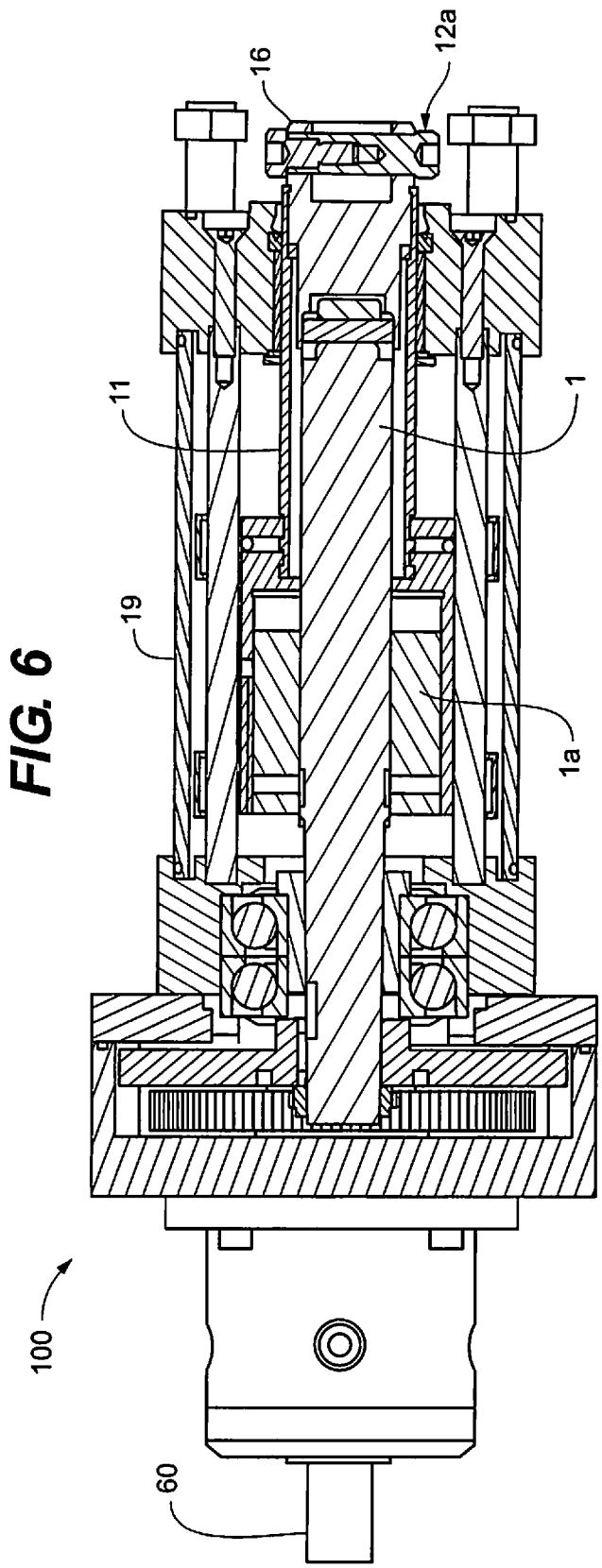
FIG. 6 is a bottom plan cross-sectional view of the actuator assembly of FIG. 1.
Figure 7:
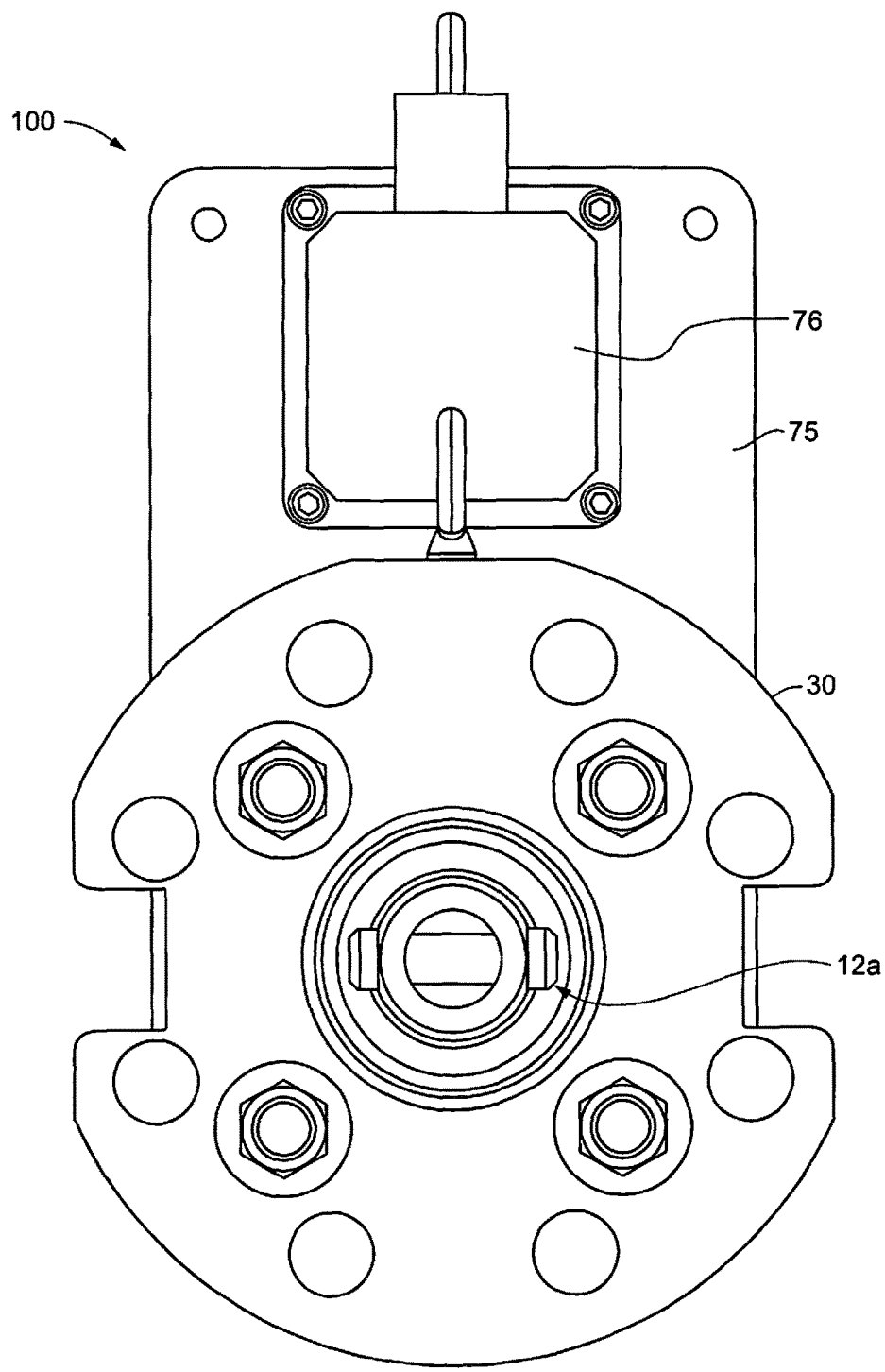
FIG. 7 is an end view of an actuator assembly with an adapter plate installed according to another embodiment of the present invention.
Figure 8:
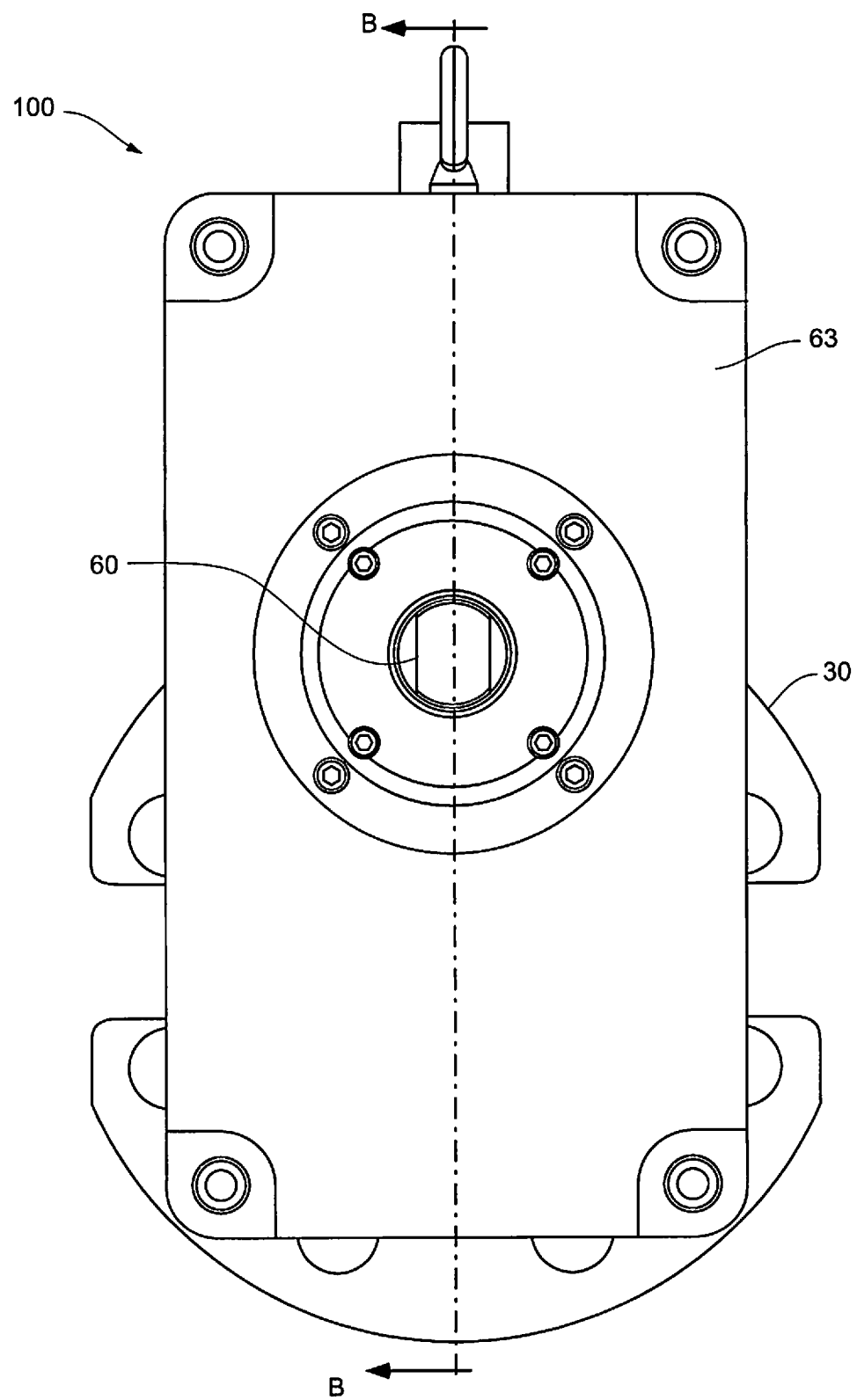
FIG. 8 is an end view of the actuator assembly of FIG. 7 from the opposite end.
Figure 9:
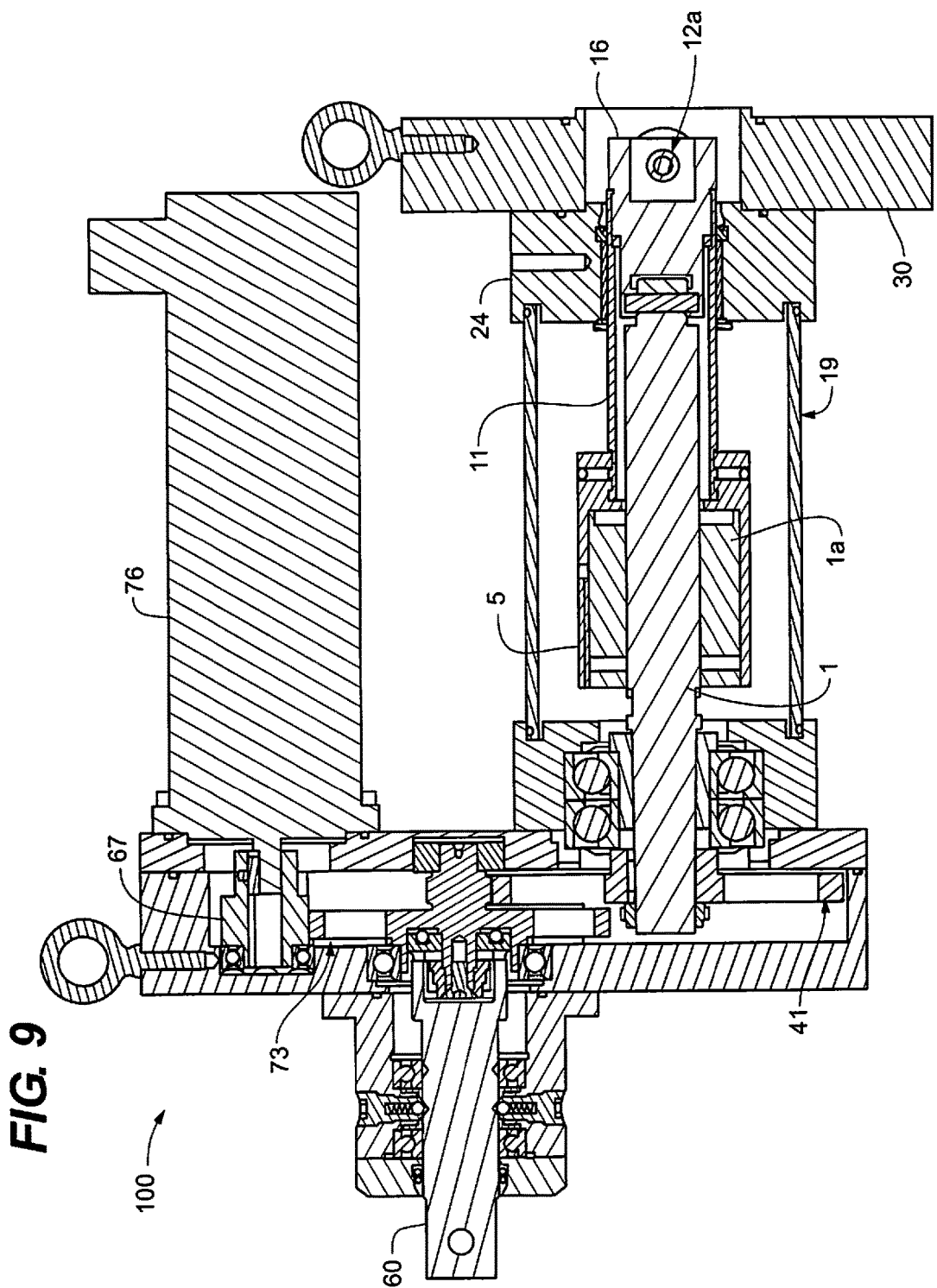
FIG. 9 is a cross-sectional view taken along the line B-B in FIG. 8.
Figure 10:
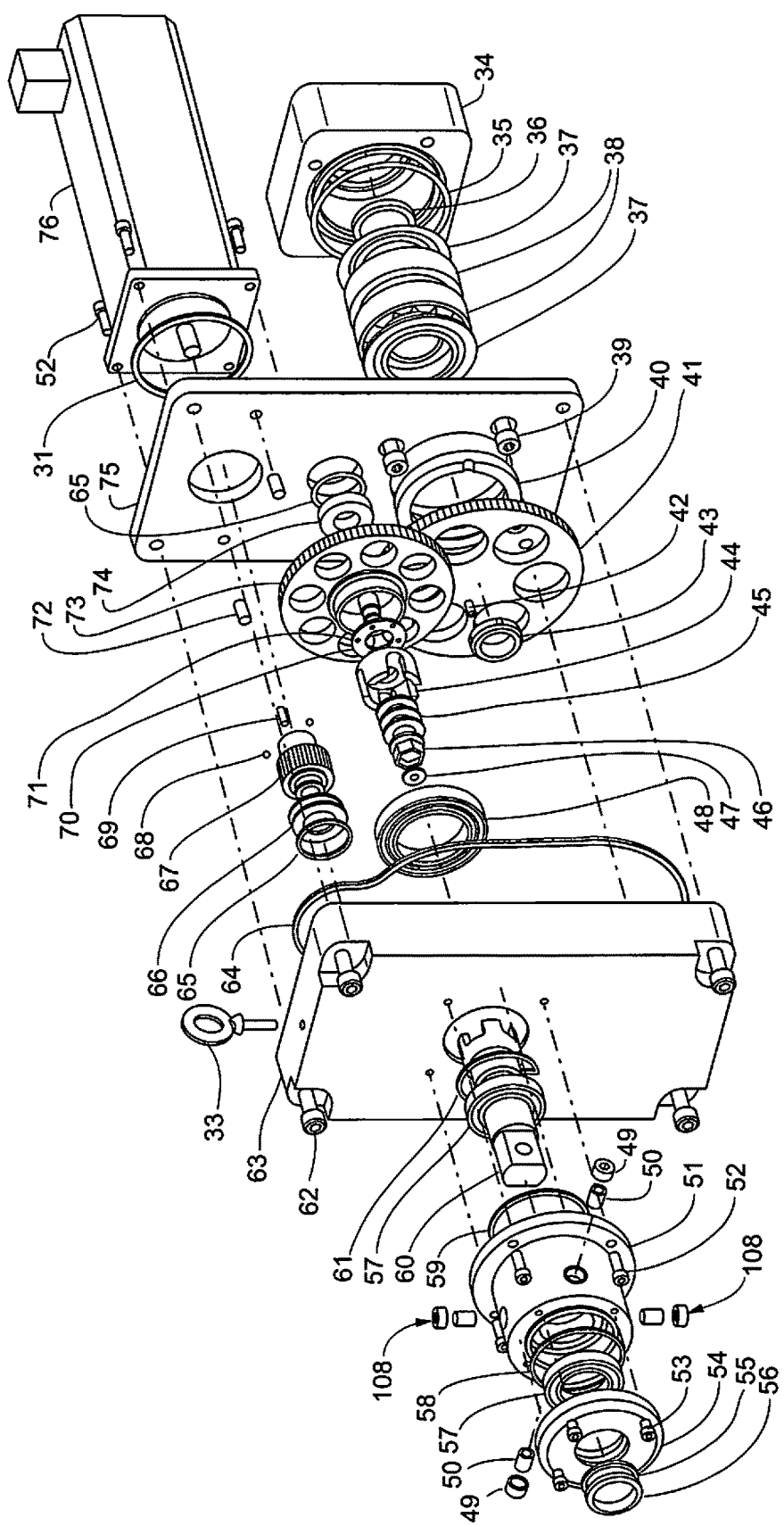
FIG. 10 is a perspective exploded view of a portion of the assembly of FIGS. 7-9.
Figure 11:
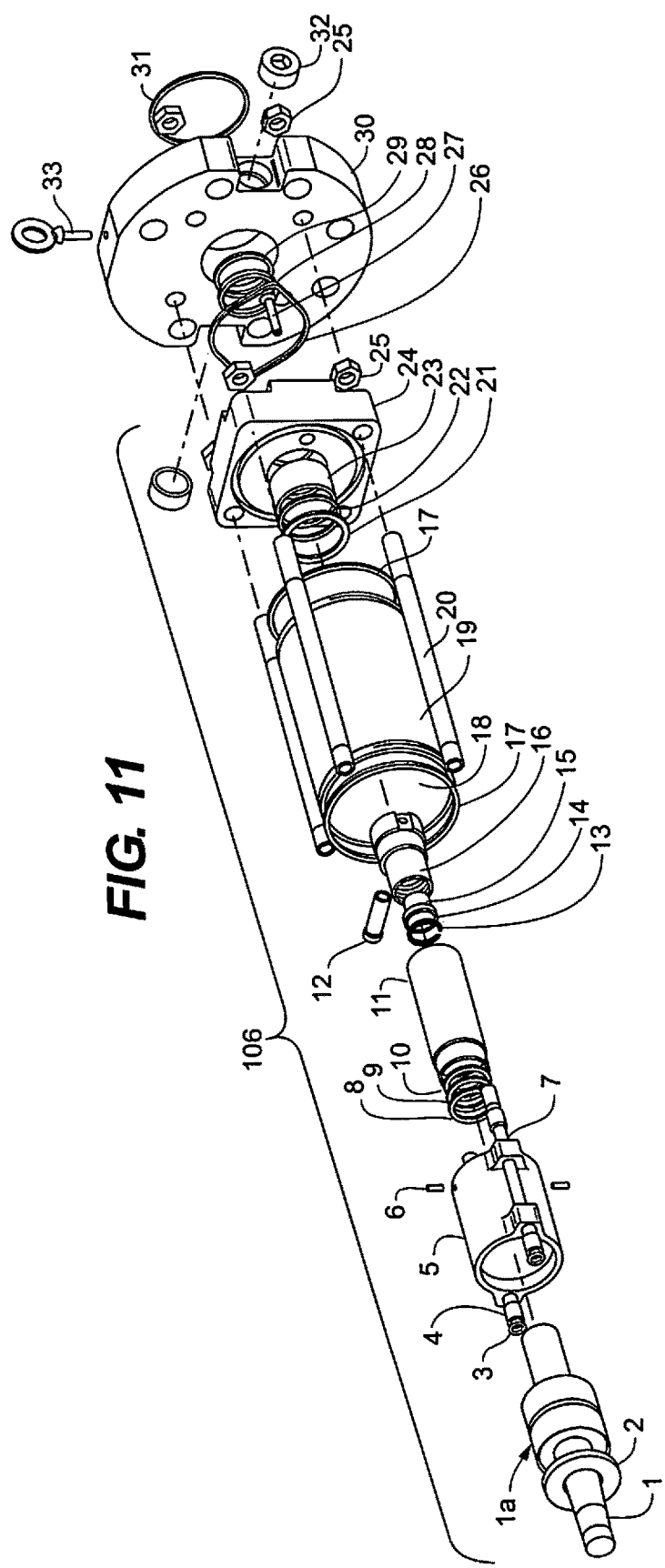
FIG. 11 is a perspective exploded view of the remaining portion of the actuator assembly of FIG. 10.
Figure 12:
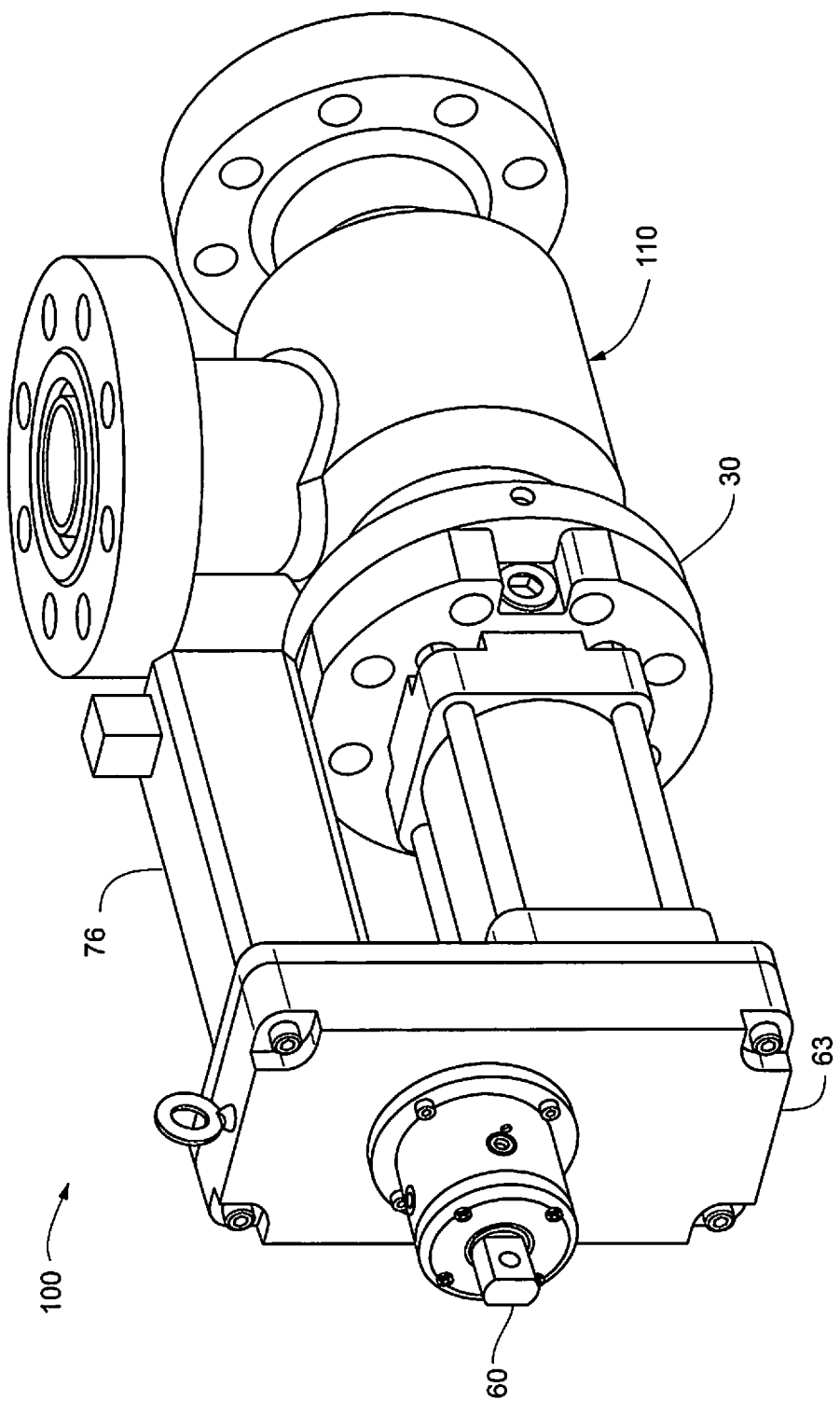
FIG. 12 is a perspective view of an actuator assembly coupled with a choke valve, according to another embodiment of the present invention.
Figure 13:
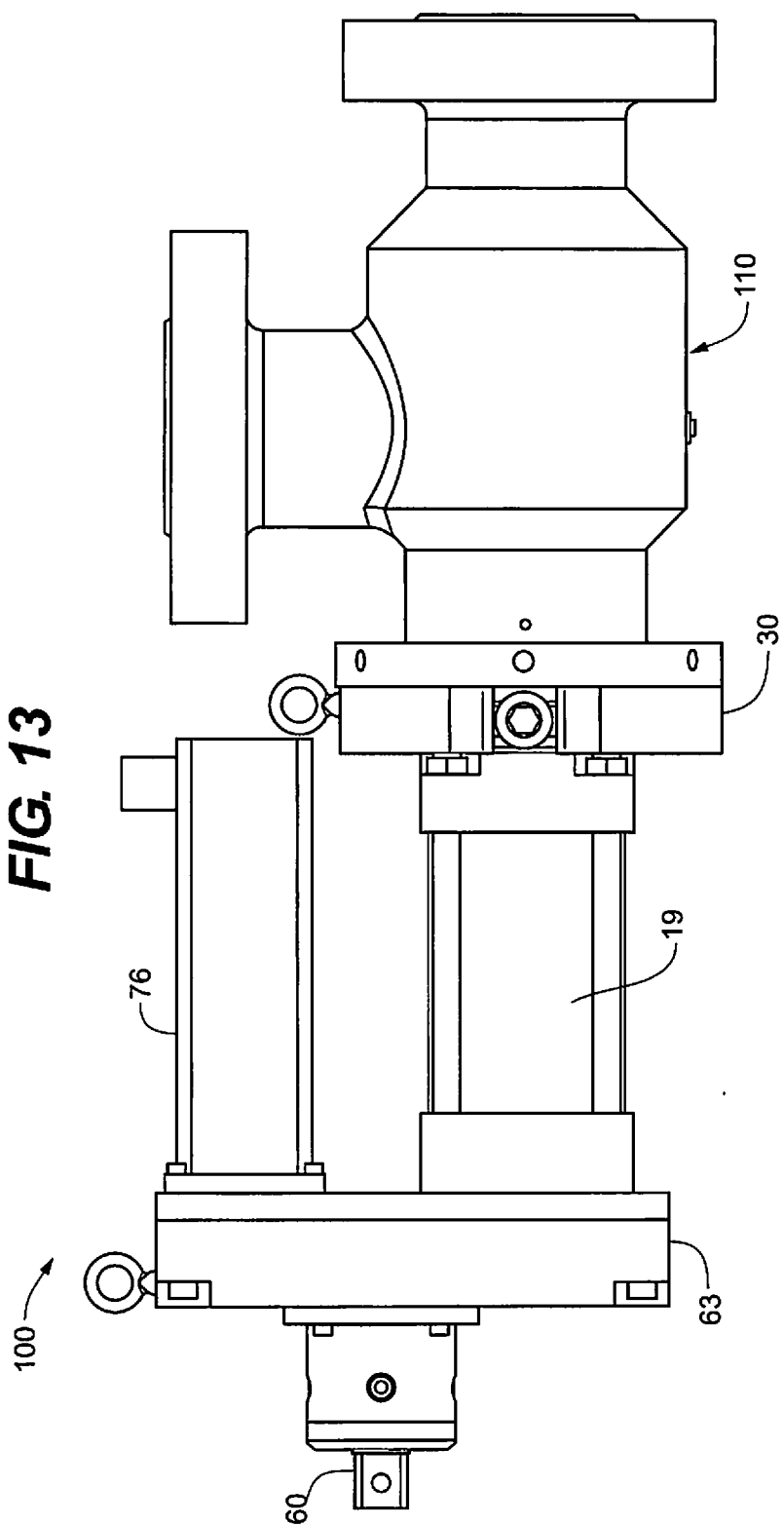
FIG. 13 is a side elevation view of the actuator assembly of FIG. 12.

Clutch shaft 60 includes a plurality of detents 107 which provide preset locations corresponding to the engaged and disengaged positions of override mechanism 104. The housing surrounding clutch shaft 60 is provided with one or more balls for selectively engaging with detents 107. The tension on balls 70 is adjustable via tensioners 108, as best depicted in FIGS. 5, 9, 9a and 10. Reference is also made to FIGS. 5, 9 and 9a, which depict override mechanism 104 in an engaged position, with second clutch fork 60a engaged with first clutch fork 44. Detents 107, in cooperation with tensioners 108, maintain clutch shaft 60 in a desired position to prevent accidental engagement or accidental disengagement of clutch shaft 60 with first clutch fork 44.

Override mechanism 104 is configured to allow manual (human) operation of actuator 106 in the event of a malfunction of, or loss of power to, motor 76. If motor 76 were to fail or lose power, actuator 106 (and thereby a choke valve 110 to which it is coupled) would remain in the position it was in when motor 76 stopped working. Such failure of motor 76 may occur during a drilling operation, and the ability to control actuator 106 is crucial to prevent damage to the well, drilling equipment and/or injury to workers. By engaging override mechanism 104, a human operator is able to open, close, or otherwise adjust the position of choke valve 110 by manually controlling actuator 106.

Due to the large gear reduction within transmission unit 102, a clutch mechanism is necessary to prevent any damage to actuator 106 during manual operation of actuator 106. A human operator is capable of inputting a much higher torque than motor 76 is capable of, and the clutch mechanism is configured to slip at a predetermined, adjustable torque limit to prevent damage to actuator 106. The clutch mechanism of override mechanism 104 is adjustable via spring washers 45, nut 46 and lock screw 47. By altering the tension on spring washers 45, the amount of force required for first clutch fork 44 to slip against ring 71 can be adjusted. Alternatively, washers 45 may comprise Belleville washers or coned-disc springs.

Actuator 106 generally includes an actuator screw 1 in communication with a roller nut 1a, a housing 5, a thrust tube 11, a rod end 16 and a coupler 12a. Roller nut 1a is secured within housing 5 and coupled to thrust tube 11. Rod end 16 is disposed on the distal end of thrust tube 11, and includes a coupler 12a configured to mate with choke valve 110, as depicted in FIG. 14, for example. Rotation of actuator screw 1 causes a linear translation of roller nut 1a, and thereby a linear translation of thrust tube 11.

Referring now to FIGS. 7-13, actuator assembly 100 further comprises an adapter plate 30 for coupling to choke valve 110. Adapter plate 30 includes a variety of mounting hole arrangements to allow actuator assembly 100 to couple to a variety of choke valves from different manufacturers. In one embodiment, adapter plate 30 may be provided in conjunction with actuator assembly 100. In another embodiment, the end user of actuator assembly 100 may provide their own adapter plate.

The present invention meets and exceeds the applicable specifications set out by the American Petroleum Institute, namely the specifications in API-6A (10.16) and API-16C (3.2.5, 9.9.10 and 9.9.11).

References to relative terms such as upper and lower, front and back, left and right, inner or outer, or the like, are intended for convenience of description and are not contemplated to limit the invention, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

The invention claimed is:
1. A system, comprising:
a brushless servo motor;
a linear actuator including a rotatable screw and a nut coupled to the screw;
a transmission coupled between the brushless servo motor and the screw, the screw configured to be retained in place and rotatable so as to cause a linear translation of the nut with respect to the screw in response to an input from the transmission; and
an override mechanism shiftable between an engaged configuration and a disengaged configuration, the override mechanism including a first portion and a second portion,
the first portion operably coupled to the transmission,
the second portion operably coupled to the first portion when the override mechanism is in the engaged configuration, and
the second portion decoupled from the first portion when the override mechanism is in the disengaged configuration; such that—
when the override mechanism is in the disengaged configuration, the input from the transmission is driven by the brushless servo motor, and
when the override mechanism is in the engaged configuration, the input from the transmission is driven by the override mechanism, such that the override mechanism enables operation of the linear actuator independently of the brushless servo motor.

2. The system of claim 1, wherein the override mechanism includes a clutch having an adjustable, predetermined torque limit.

3. The system of claim 1, wherein the brushless servo motor has between one and five horsepower.

4. The system of claim 1, wherein the transmission has a gear reduction of between 10:1 and 40:1.

5. The system of claim 1, further comprising a choke valve operably coupled to the nut of the linear actuator, the system being configured for use in a managed pressure drilling operation.

* * * * *

UNITED STATES PATENT AND TRADEMARK OFFICE
CERTIFICATE OF CORRECTION

PATENT NO. : 9,816,592 B1
APPLICATION NO. : 14/874687
DATED : November 14, 2017
INVENTOR(S) : Glikin et al.

Page 1 of 1

It is certified that error appears in the above-identified patent and that said Letters Patent is hereby corrected as shown below:

Item (72), Inventors:
After "Ryan T. Klemetson" delete "Buffalo, NY" and insert -- Buffalo, MN --.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*